United States Patent
Kumada et al.

(10) Patent No.: US 6,523,811 B1
(45) Date of Patent: Feb. 25, 2003

(54) METHOD AND DEVICE FOR TEMPERATURE REDUCTION OF EXHAUST GAS BY MAKING USE OF THERMAL WATER

(75) Inventors: Masayuki Kumada, Amagasaki (JP); Keiji Mukai, Amagasaki (JP)

(73) Assignee: Takuma Co., Ltd. (JP)

( * ) Notice: Subject to any disclaimer, the term of this patent is extended or adjusted under 35 U.S.C. 154(b) by 0 days.

(21) Appl. No.: 09/639,662

(22) Filed: Aug. 16, 2000

(51) Int. Cl.$^7$ .................................................. B01F 3/04
(52) U.S. Cl. ........................ 261/128; 261/115; 261/130; 95/228
(58) Field of Search .............................. 261/128, 129, 261/130, 115; 95/227, 228; 96/181, 243, 251, 253, FOR 159, FOR 163

(56) References Cited

U.S. PATENT DOCUMENTS

| | | | | |
|---|---|---|---|---|
| 3,530,807 A | * | 9/1970 | Zalman | 96/243 |
| 3,704,570 A | * | 12/1972 | Gardenier | 96/243 |
| 3,834,133 A | * | 9/1974 | Bow | 96/181 |
| 4,019,882 A | * | 4/1977 | Herrera | 96/243 |
| 4,028,072 A | * | 6/1977 | Braun et al. | 96/181 |
| 4,110,999 A | * | 9/1978 | Dvirka | 62/171 |
| 4,383,838 A | * | 5/1983 | Barten et al. | 96/181 |
| 4,584,147 A | * | 4/1986 | Stehning | 96/243 |
| 5,658,361 A | * | 8/1997 | Arencibia, Jr. | 96/251 |

* cited by examiner

Primary Examiner—C. Scott Bushey
(74) Attorney, Agent, or Firm—Griffin & Szipl, P.C.

(57) ABSTRACT

A system for reducing the temperature of exhaust gas in an incinerator or boiler equipment having an exceedingly small size and avoiding any difficulties caused by damage to the wall surface of a gas cooling chamber due to adherence of sprayed water droplets and deposition of dust. More specifically, pressurized thermal water with a temperature higher than a boiling point of water under atmospheric pressure is sprayed as temperature reduction water into high temperature exhaust gas Gh in a gas cooling chamber or an exhaust gas duct. The temperature reduction of exhaust gas and the removal of acidic gas in the exhaust gas are simultaneously achieved by spraying pressurized thermal water Wt containing an alkaline solution as temperature reduction water into high temperature exhaust gas Gh in the gas cooling chamber or the exhaust gas duct.

8 Claims, 9 Drawing Sheets

PRIOR ART

PRIOR ART

METHOD AND DEVICE FOR TEMPERATURE REDUCTION OF EXHAUST GAS BY MAKING USE OF THERMAL WATER

TECHNICAL FIELD OF THE INVENTION

This invention relates to the treatment of exhaust gas emitted from combustion systems such as waste incinerators, boilers and the like, and more particularly to an improved method and device for reducing the temperature of exhaust gas to substantially reduce the size of the device, to prevent damage to a gas cooling chamber or an exhaust gas duct caused by sprayed water, to eliminate operational difficulties caused by the deposit of dust, and also to remove acidic gas contained in the exhaust gas.

BACKGROUND OF THE INVENTION

Conventionally, exhaust gas emitted from combustion systems such as waste incinerators, boilers and the like is diffused into the atmosphere after being purified by a gas purification device.

In some cases of purification treatment, it has been found necessary that the temperature of the exhaust gas be reduced to an appropriate temperature, for example, approximately 120–250° C. depending on the gas purification device used. Conventionally, in such cases, gas purification devices spray water into the exhaust gas and utilise its heat capacity and latent heat of evaporation to reduce the temperature of the exhaust gas.

Referring to FIG. 9 and FIG. 10, examples are shown of a conventional device to reduce the temperature of exhaust gas, wherein 21 is a gas cooling chamber, 21a is an exhaust gas inlet, 21b is an exhaust gas outlet, 21c is an ash outlet, 22 is a temperature reduction water tank, 23 is a pressure pump, 24 is a temperature reduction water nozzle, 25 is a temperature control device, 25a is a temperature detector, 26 is a temperature reduction water volume control valve, 27 is a injection pump, 28 is an air compressor, 29 is a compressed air tank, 30 is a mixer, Gh is high temperature exhaust gas, Gl is low temperature exhaust gas and C is ash.

With reference to the device for reducing the temperature of exhaust gas in FIG. 9, high pressure water from the temperature reduction water tank 22, pressurized by the pressure pump 23, is sprayed into the gas cooling chamber 21 through the temperature reduction water nozzle 24 provided in the vicinity of the exhaust gas inlet 21a. The temperature of sprayed water rises in contact with high temperature exhaust gas Gh, and is vaporised to become steam when it reaches its boiling point.

On the other hand, high temperature exhaust gas Gh in the gas cooling chamber 21 is cooled by the heat capacity of the sprayed water, latent heat of evaporation and the heat capacity of the steam, thus lowering the temperature to a prescribed temperature so as to be led out of the exhaust gas outlet.

The volume of water to be sprayed into the gas cooling chamber 21 is controlled by adjusting the opening of the temperature reduction water volume control valve 26 through the temperature control device 25 in response to temperature detecting signals from the temperature detector 25a. The temperature of low temperature exhaust gas G led out of the exhaust gas outlet 21b is maintained at a desired temperature by controlling water volume to be sprayed into the gas cooling chamber 21 by means of controlling the volume of water returned to the temperature reduction water tank 22.

With reference to the device for reducing the temperature of exhaust gas shown in FIG. 10, water sent from the temperature reduction water tank 22 by means of the injection pump 27 and high pressured air sent from the compressed air tank 29 are mixed for atomisation in the mixer 30. Atomised water is sprayed into the gas cooling chamber 21 from the mixer 30, through the temperature reduction water nozzle provided in the vicinity of the exhaust gas inlet 21a.

Features such as (1) that the temperature of sprayed water rises in contact with high pressure exhaust gas Gh and is vaporised to become vapour steam when it has reached its boiling point, (2) that high temperature exhaust gas Gh in the gas cooling chamber 21 is cooled by the heat capacity of the sprayed water, latent heat of evaporation and heat capacity of the steam vapour, (3) that the water volume to be sprayed into the gas cooling chamber 21 is controlled by adjusting the opening of the temperature reduction water volume control valve 26 through the temperature control device 25, and (4) that the temperature of low temperature exhaust gas G is maintained at a desired temperature by controlling water volume to be sprayed, are all precisely the same as those features in FIG. 9. The previous devices for the temperature reduction of exhaust gas shown in FIGS. 9 and 10 are capable of reducing the temperature of high temperature exhaust gas Gh to a desired temperature by utilising low cost water, thus achieving excellent and practical effects.

There remain, however, a number of difficulties related to the aforementioned prior devices for temperature reduction of exhaust gas, of which, major difficulties include (a) that refractories are damaged by the downflow of water droplets when they hit the wall surface of the gas cooling chaser directly, (b) that stable operation of the gas cooling chamber is impaired by dust adhered to and deposited on the wall surface, and (c) that it is difficult to provide a device for temperature reduction of exhaust gas having a small size since the gas cooling chamber remains large in size.

In the event of a single fluid method wherein only water is utilized, as shown in FIG. 9, difficulties remain in making the atomized temperature reduction water have particles of micro-sized diameters, even by increasing the pressure of the water or making improvements in the water nozzle 24. With this method, the diameters of atomised particles of temperature reduction water normally stay coarse, having diameters around 70–200 $\mu$m, which makes it difficult for the atomised temperature reduction water to be thoroughly vaporised within a limited space, thus causing damage to the refractory when water droplets hit the wall surface of the gas cooling chamber directly.

Even when damage to the refractory is avoided, there is a possibility that dust would adhere to and deposit at the surface of the refractory that is wet with water droplets, that deposits adhered to the surface of the refractory would gradually grow, and that the passage resistance of exhaust gas in the gas cooling chamber would increase and fluctuate considerably, thus making the smooth operation of the gas cooling chamber difficult.

With a double fluid method shown in FIG. 10, wherein water and compressed air are employed, the diameters of atomised particles of temperature reduction water normally become around 30–100 $\mu$m thus reducing the frequency of problems in comparison with the single fluid method.

However, this double fluid method is not ideal from the viewpoint of cost because of the high initial and running costs of compressed air equipment.

Furthermore, the time required before the aforementioned atomised cooling water reaches its boiling point and evaporates thoroughly is considerably long. This means that it becomes necessary for the retention time of exhaust gas in a gas cooling chamber to be sufficiently long, thus requiring a gas cooling chamber of a large capacity.

For example, in the case of an industrial waste incinerator with a capacity to handle incineration disposal of industrial waste of approximately 300 T/D (tons per day), assuming high temperature exhaust gas Gh with an exhaust gas volume of 90,000 Nm$^3$/H (flow rate of gas with volume converted to normal or standard volume) and an inlet exhaust gas temperature of 240° C. is converted to low temperature exhaust gas G with an inlet gas temperature of 180° C., a gas cooling chamber of an internal diameter of approximately 4,800 mm and the height of approximately 9,000 mm is required with a device for temperature reduction of exhaust gas by means of a single fluid method as shown in FIG. 9. Thus, the total height of the device for temperature reduction of exhaust gas including an exhaust gas inlet 21a, an exhaust gas outlet 21b and an ash outlet 21c would be approximately 180,000 mm.

When designing previous devices for temperature reduction of exhaust gas, the heat load of the gas cooling chamber is normally chosen to have a value of 5,000–10,000 kcal/m$^3$·H (heat value taken away from exhaust gas per unit volume and unit time of a gas cooling chamber in units of kilocalories per meter cubed per hour). For example, the heat load of the gas cooling chamber is chosen to be 7,000 kcal/m$^3$·H.

SUMMARY OF THE INVENTION

The present invention is concerned with solving the aforementioned problems with the prior devices for temperature reduction of exhaust gas, namely, (a) that, due to coarse particle diameters of atomised temperature reduction water, water droplets directly hitting the wall surface of the gas cooling chamber cause damage to the refractory, and, due to dust adhered to and deposited on the wall surface, the smooth operation of the gas cooling chamber is disturbed with the single fluid method, (b) that pressurized air equipment is required, thus increasing both initial and running costs with the double fluid method, and (c) that it becomes difficult to make the gas cooling chamber significantly smaller in size due to the time consumed before atomised water particles evaporate. Accordingly, it is an object of the present invention to provide a method and device for effective and economical temperature reduction of exhaust gas having an exceedingly small size by means of reducing the diameter of the atomised water particles.

The inventor of the present invention has acquired knowledge through designing, manufacturing and experimenting with numerous devices for temperature reduction of exhaust gas. For example, the inventor has found that with a device for temperature reduction of exhaust gas using the single fluid method wherein only water is employed, it is difficult to reduce the particle diameter of atomised temperature reduction water smaller than approximately 100 $\mu$m just by providing an improved temperature reduction water nozzle or raising the pressure of temperature reduction water, as long as a temperature reduction water nozzle is employed for atomisation. Accordingly, it is difficult to provide a gas cooling chamber having a remarkably reduced volume.

The inventor of the present invention, therefore, has departed from the conventional idea of the design of the prior art type of device for temperature reduction of exhaust gas wherein water of a normal temperature of approximately 20–30° C. is employed as temperature reduction water, and heat capacity of water and latent heat of evaporation are effectively utilized, and has come to the idea of a process wherein air-liquid of pressurized water at the boiling point of water under atmospheric pressure or pressurized thermal water partly containing steam is atomised and injected through a conventional temperature reduction nozzle.

When pressurized water of a temperature higher than the boiling point of water under atmospheric pressure is used, the heat value equivalent of the heat capacity of the water to be utilized for cooling exhaust gas is reduced compared with the prior single fluid method, thus resulting in a slight increase in the water volume required.

However, when said pressurized thermal water is sprayed through a temperature reduction water nozzle into a gas cooling chamber, there occurs so-called boiling under reduced pressure in the vicinity of the outlet of temperature reduction water nozzle, and particle diameters of atomised water become micro-sized in a range of approximately 3 $\mu$m–50 $\mu$m, and the water rapidly evaporates within a short period of time in a gas cooling chamber, thus enabling improvement of the cooling effect of exhaust gas and allowing the gas cooling chamber to be smaller in size.

The present invention has come into existence based upon the results of numerous experiments related to temperature reduction of exhaust gas based on the aforementioned ideas which go against the conventional technical common sense or practices carried out by others.

In a first embodiment according to the present invention, the present invention relates to spraying pressurized thermal water with a temperature higher than the boiling point of water under atmospheric pressure as temperature reduction water into exhaust gas.

In a second embodiment according to the present invention, the present invention relates to spraying pressurized thermal water with a temperature higher than the boiling point of water under atmospheric pressure as temperature reduction water into a gas cooling chamber or an exhaust gas duct.

In a third embodiment according to the present invention, thermal water taken out of a deaerator or continuous blow water of a boiler is utilized as part of the pressurized thermal water.

In a fourth embodiment according to the present invention, pressurized thermal water partly containing steam is used as temperature reduction water.

In a fifth embodiment according to the present invention, pressurized thermal water containing an alkaline solution is used as temperature reduction water.

In a sixth embodiment according to the present invention, heated alkaline solution is mixed into the thermal water.

In a seventh embodiment according to the present invention, alkaline solution is used as an alkaline aqueous solution or alkaline slurry solution.

In an eighth embodiment according to the present invention, an alkaline aqueous solution containing sodium hydroxide (caustic soda), or an alkaline slurry solution containing calcium hydroxide (slaked lime) is used.

In a ninth embodiment according to the present invention, the present invention comprises a gas cooling chamber equipped with a gas inlet, a gas outlet and an ash outlet, a thermal water tank for storing pressurized thermal water with a temperature higher than the boiling point of water under atmospheric pressure, a temperature reduction water nozzle to spray thermal water from the thermal water tank into the gas cooling chamber, a temperature reduction water volume control valve to adjust the volume of thermal water to be supplied to the temperature reduction water nozzle, a temperature detector for low temperature exhaust gas flowing from the gas outlet, and a temperature control device with an opening and closing mechanism for controlling the temperature reduction water volume control valve in response to detecting signals from the aforementioned temperature detector.

In a tenth embodiment according to the present invention, the present invention comprises an exhaust gas duct through which exhaust gas flows, a thermal water tank for storing pressurized thermal water with a temperature higher than the boiling point of water under atmospheric pressure, a temperature reduction water nozzle to spray thermal water from the thermal water tank into the exhaust gas duct, a temperature reduction water volume control valve to adjust the volume of thermal water supplied to the temperature reduction water nozzle, a temperature detector for low temperature exhaust gas flowing from the exhaust gas duct, and a temperature control device with an opening and closing mechanism for controlling the temperature reduction water volume control valve in response to detecting signals from the aforementioned temperature detector.

In an eleventh embodiment according to the present invention, thermal water is supplied to the temperature reduction water nozzle by means of an internal pressure of the thermal water tank.

In a twelfth embodiment according to the present invention, the basic constitution of the present invention comprises a gas cooling chamber equipped with a gas inlet, a gas outlet and an ash outlet, a thermal water tank for storing pressurized thermal water with a temperature higher than the boiling point of water under atmospheric pressure, an alkaline solution tank for storing alkaline solution, a mixer for mixing thermal water from the thermal water tank and alkaline solution from the alkaline solution tank, a temperature reduction water nozzle for spraying thermal water containing alkaline solution from the aforementioned mixer into the gas cooling chamber, a temperature reduction water volume control valve for adjusting the flow volume of thermal water containing alkaline solution to be supplied to the temperature reduction water nozzle, an alkaline solution volume control valve for adjusting the flow volume of alkaline solution to be supplied to the aforementioned mixer, a temperature detector for low temperature exhaust gas flowing from the gas outlet, an acid gas concentration detector for the aforementioned low temperature exhaust gas, a temperature control device with an opening and closing mechanism for controlling the temperature reduction water volume control valve by means of detecting signals from the aforementioned temperature detector, and an acid gas concentration control device with an opening and closing mechanism for controlling the alkaline solution volume control valve by means of detecting signals from the aforementioned acid gas concentration detector.

In a thirteenth embodiment according to the present invention, an alkaline solution heater for heating alkaline solution is installed in the alkaline solution inlet side of the mixer.

In a fourteenth embodiment according to the present invention, an alkaline solution tank is used for the alkaline solution tank for storing alkaline aqueous solution or alkaline slurry solution.

In a fifteenth embodiment according to the present invention, the present invention comprises an exhaust gas duct through which exhaust gas flows, a thermal water tank for storing pressurized thermal water with the temperature higher than a boiling point of water under atmospheric pressure, an alkaline solution tank for storing alkaline solution, a mixer for mixing thermal water from the thermal water tank and alkaline solution from the alkaline solution tank, a temperature reduction water nozzle for spraying thermal water containing alkaline solution from the aforementioned mixer into the exhaust gas duct, a temperature reduction water volume control valve for adjusting the flow volume of thermal water containing alkaline solution to be supplied to the temperature reduction water nozzle, an alkaline solution volume control valve for adjusting the flow volume of alkaline solution to be supplied to the aforementioned mixer, a temperature detector for low temperature exhaust gas flowed from the outlet of the exhaust gas duct, an acid gas concentration detector for the aforementioned low temperature exhaust gas, a temperature control device with an opening and closing mechanism for controlling the temperature reduction water volume in response to detecting signals from the aforementioned temperature detector, and an acid gas concentration control device with an opening and closing mechanism for controlling the alkaline solution volume control valve in response to detecting signals from the aforementioned acid gas concentration detector.

In a sixteenth embodiment according to the present invention, an alkaline solution heater for heating alkaline solution is installed in the alkaline solution inlet side of the mixer.

In a seventeenth embodiment according to the present invention, an alkaline solution tank is provided for storing alkaline aqueous solution or alkaline slurry solution.

Any combustion system such as a waste incinerator, a boiler and the like can be the emission source of the aforementioned high temperature exhaust gas, and the present invention is applicable to temperature reduction of all kinds of exhaust gas from combustion.

The temperature of high temperature exhaust gas Gh supplied to a gas cooling chamber can be fixed at the temperature of 150° C.–1000° C., and the temperature of low temperature exhaust gas G supplied from the gas cooling chamber can be fixed at a temperature higher than about 100° C. For example, when the present invention is applied to primary cooling of exhaust gas, the temperature of high temperature exhaust gas Gh and the temperature of low temperature exhaust gas G can be fixed at approximately 900° C.–1000° C. and 150° C.–250° C., respectively. When the present invention is applied to secondary cooling of exhaust gas, the temperature of high temperature exhaust gas Gh and the temperature of low temperature exhaust gas G can be fixed at approximately 200° C.–400° C. and 120° C.–250° C. respectively.

The aforementioned gas cooling chamber can be formed in either a vertical shape or horizontal shape, and its cross section can be of any suitable shape, such as, for example, a circle, an ellipse or a square.

Similarly, the form of the aforementioned exhaust gas duct can be either of long width or short width, and its cross section can be of any suitable shape, such as, for example, a circle, an ellipse or a square.

The aforementioned pressurized thermal water Wt is water maintained at a temperature higher than the boiling point of water (100° C.) under atmospheric pressure, or so-called water of high pressure and high temperature. The pressure of the pressurized thermal water Wt can be chosen at values of approximately 1 kg/cm$^2$G–100 kg/cm$^2$G. However, taking the pressure resistance of a thermal tank 2 into consideration, it is desirable that it is chosen somewhere between 3–10 kg/cm$^2$G.

Pressurized thermal water Wt can partly contain steam. However, less steam content is desirable.

As a heat source for producing thermal water, water vapour from a waste heat boiler can be utilized if the combustion system, an incinerator, for example, is equipped with a waste heat boiler, and part of the vaporised steam can be utilized when the combustion system is a boiler.

With an incinerator not equipped with a waste heat boiler, either an exhaust heat exchanger is installed to utilise water vapour from the exchanger, or an independent steam or electric boiler of a small capacity can be installed.

When a deaerator is attached to the waste heat boiler of an incinerator or a boiler, thermal water produced in the deaerator can be used as temperature reduction water as it is. In this case, a device for temperature reduction can be constituted inexpensively because all that is needed for supplying thermal water Wt is installation of a pipe from the deaerator.

Furthermore, if a boiler or an incinerator equipped with waste heat boiler is used as a combustion system, continuous blow water from the boiler can be utilized as part of thermal water to be used as temperature reduction water. Most boiler equipment is designed so that part of boiler water (thermal water) is discharged outside to stop the rise of concentration of corrosion inhibitor and the like in the boiler water, so that a stable function of the corrosion inhibitor is performed. Boiler water discharged outside is normally found to be alkaline water of pH 8.5–11.8, having dechlorination or desulfurisation effects. Therefore, when chemicals are used for dechlorination or desulfurisation of exhaust gas, the amount of chemicals can be reduced.

If the gas cooling chamber is of a vertical type, it is desired that the temperature reduction water nozzle for atomising pressurized thermal water be installed at an upper part and in the vicinity of a gas inlet for high temperature exhaust gas Gh. The installation position of the temperature reduction water nozzle can be chosen as desired depending on the type of gas cooling chamber and the number of temperature reduction water nozzles to be installed. The same feature can be extended to the case wherein pressurized thermal water is injected inside an exhaust gas duct.

Any kind of suitable construction of nozzle such as water spray nozzles, for example, conventional screw type or collision type nozzles can be utilized.

Further, the number of temperature reduction water nozzles can be chosen as desired depending on such factors as the shape of the gas cooling chamber or exhaust gas duct, the number of ejection apertures installed at a nozzle, and the required ejection volume of thermal water, etc. For example, with a device for temperature reduction of exhaust gas for a prior art industrial waste incinerator (having a volume of incineration of 300 ton/D, a volume of exhaust gas of 90,000 Nm$^3$/H, secondary cooling of exhaust gas (high temperature exhaust gas Gh at 240° C. and low temperature exhaust gas G at 180° C.), thermal water (saturated water of temperature 142.9° C. and pressure 3 kg/m$^2$G), a temperature reduction water nozzle having three ejection apertures is installed at the upper part of the gas cooling chamber as described hereafter.

According to the present invention, the temperature and pressure of thermal water sprayed through a temperature reduction water nozzle becomes considerably higher than the boiling point of water under atmospheric pressure (100° C.). Abrupt boiling under reduced pressure in the vicinity of an outlet of the nozzle ejection mouth produces micro-sized particles which instantly evaporate to water vapour after spraying, thus causing no direct impact of the wall surface of the gas cooling chamber liquid water droplets.

The results of the present invention, thus enable the volume of the gas cooling chamber to be small, reducing installation costs and space. For example, with a device for temperature reduction of exhaust gas equipped on the outlet side of a waste gas boiler of the aforementioned prior art industrial waste incinerator, when the temperature of high temperature exhaust gas is reduced from 240° C. to 180° C., it is found the heat load of the gas cooling chamber can achieve 50,000–150,000 kcal/m$^3$·H.

Namely, compared with the heat load (5,000–10,000 kcal/m$^3$·H) of a gas cooling chamber in a prior art device for temperature reduction of exhaust gas, the device for temperature reduction of exhaust gas in the present invention can be chosen at the range of 50,000–150,000 kcal/m$^3$·H, thus enabling the volume of the gas cooling chamber to be reduced from $\frac{1}{5}$–$\frac{1}{15}$.

Furthermore, the present invention allows the device to be constructed so that thermal water is directly sprayed into a high temperature exhaust gas duct by inserting a temperature reduction water nozzle, without providing a gas cooling chamber.

When thermal water is used for temperature reduction water, the volume of water sprayed increases slightly comparing with the case where low temperature water is used, as conventionally practised, due to the reason that the cooling capacity, which corresponds to the heat capacity, is lowered. For example, when the temperature of temperature reduction water with the conventional device for temperature reduction of exhaust gas is kept at 20° C. and the temperature of thermal water with the device for temperature reduction of exhaust gas according to the present invention at 142.9° C. (saturated water of pressure 3 kg/cm$^2$ G), it is found that approximately 1.2 times the volume of thermal water is required. This increase, however, does not require a larger size pipe for the thermal water line, thus not requiring much extra installation cost.

Thermal water mixed with alkaline solution used as temperature reduction water is ejected into exhaust gas through a temperature reduction water nozzle to remove hydrogen chloride (HCl) or sulphur oxide (SO$_2$) contained in the exhaust gas.

The aforementioned alkaline solution can be in the form of either an alkaline aqueous solution or an alkaline slurry solution.

The temperature of the alkaline solution mixed in the thermal water is not necessarily required to be raised by heating when the temperature of temperature reduction water mixed with said alkaline solution is higher than the boiling point of water under atmospheric pressure. It is, however, desirable that, when the temperature of temperature reduction water becomes lower than the boiling point of water under atmospheric pressure by mixing with the alkaline solution, that the temperature reduction water be heated to a required temperature before the alkaline solution is mixed into the thermal water.

Any kind of alkaline agent in the aforementioned alkaline solution can be used. However, when it is used in the form of alkaline aqueous solution, sodium hydroxide (caustic soda, NaOH) or magnesium hydroxide (Mg(OH)$_2$) are preferred.

When an alkaline slurry solution is used, sodium hydroxide (slaked lime, Ca (OH)$_2$), quick lime (CaO), calcium carbonate (CaCO$_3$), and sodium carbonate (Na$_2$CO$_3$) are preferred.

The total amount of alkaline agent in the alkaline solution to be mixed into the aforementioned thermal water is appropriately adjusted depending on the type and quantity of acidic gas in the exhaust gas and the temperature of the exhaust gas. Normally, alkaline agents of an equivalent ratio of 0.8–1.5 are mixed into the thermal water.

Further objects, features and advantages of the present invention will become apparent from the Detailed Description of Preferred Embodiments which follows, when considered together with the attached Drawings.

DETAILED DESCRIPTION OF THE PREFERRED EMBODIMENTS

Figure 1:
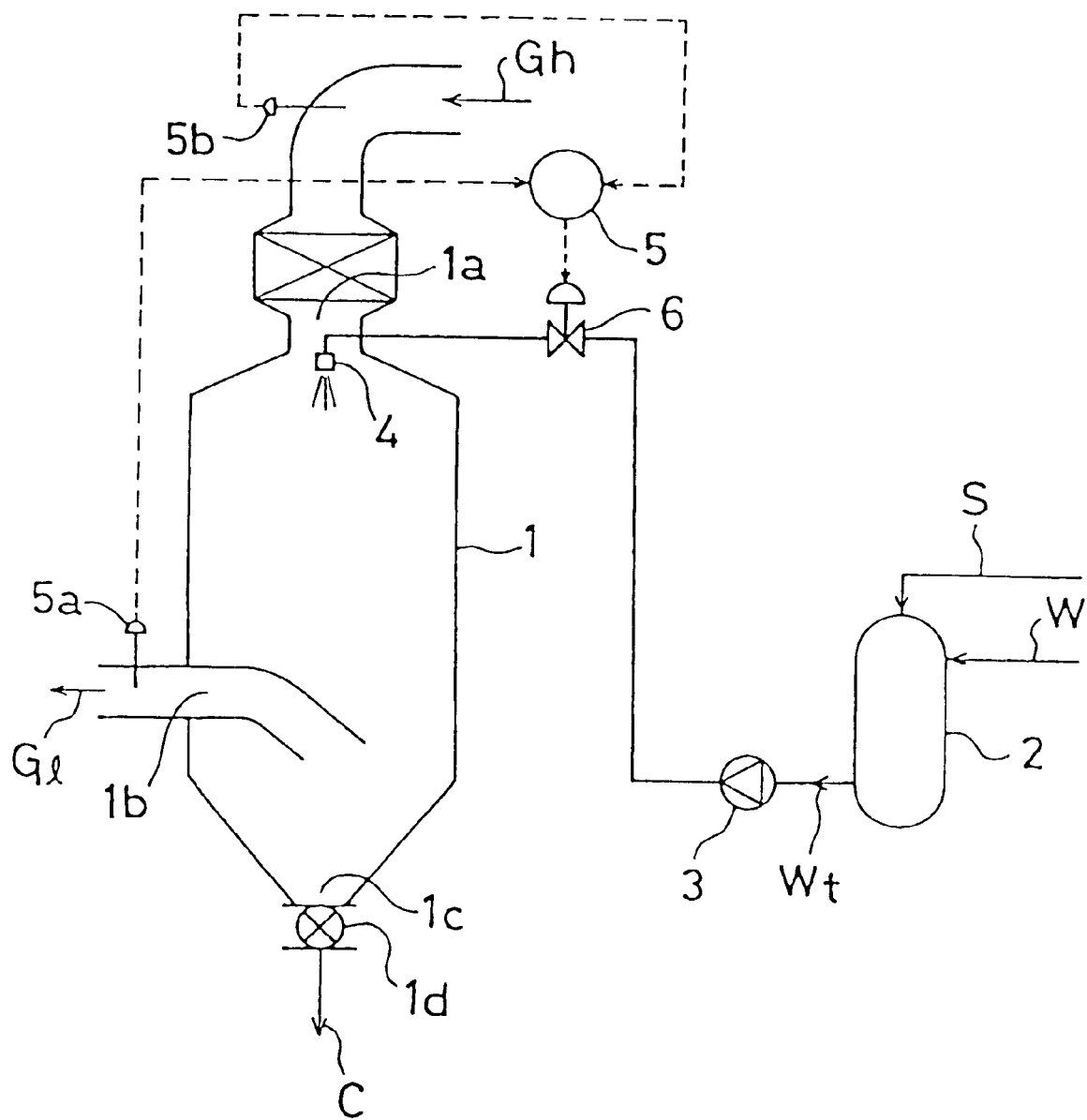
FIG. 1 is a diagrammatic illustration of a method and device for temperature reduction of exhaust gas according to an embodiment of the present invention.

The reference numerals, as used in the preceding description and in the Figs. are as follows: 1 is a gas cooling chamber, 1a an exhaust gas inlet, 1b an exhaust gas outlet, 1c an ash outlet, 1d airtight retaining device, 2 a thermal water tank, 3 a pump, 4 a temperature reduction water nozzle, 4a an ejection mouth, 4b a main body, 4c a screw, 4d a water lead-in hole, 5 a temperature control device, 5a an exhaust gas temperature detector on the outlet side, 6 a water reduction volume control valve, Gh high temperature exhaust gas, Gl low temperature exhaust gas, S heated steam, C ash, Wt thermal water, 7 a duct, 7a a flange for fixing a temperature reduction water nozzle, 7b a duct outlet, 8 an alkaline solution tank, 8b a stirrer, 9 an alkaline solution pump, 10 an alkaline solution flow volume control valve, 11 an alkaline solution heater, 11a a drain valve, 12 a mixer, 13 an acid gas concentration detector for low temperature exhaust gas, Wp alkaline solution, P alkaline agents, $W_1$ water, and S1 steam for heating.

FIG. 1 illustrates an embodiment of the method and device for temperature reduction of an exhaust gas according to the present invention, wherein 1 designates a gas cooling chamber, 1a an exhaust gas inlet, 1b an exhaust gas outlet, 1c an ash outlet, 1d an airtight retaining device, 2 a thermal water tank, 3 a pump, 4 a temperature reduction water nozzle, 5 a temperature control device, 5a an exhaust gas temperature detector on the outlet side, 5b an exhaust gas temperature detector on the inlet side, 6 a temperature reduction water volume control valve, Gh high temperature exhaust gas, G low temperature exhaust gas, S heated steam, at thermal water, and C ash.

Referring now to FIG. 1, a gas cooling chamber 1 is in the form of a tower in which a wall surface is formed with an adiabatic structure by employing a known heat insulating material.

Also provided are an exhaust gas inlet 1a on the upper part of a gas cooling chamber 1, an exhaust gas outlet 1b on the lower part, an ash outlet at the lower end of a reversed conical part downwards 1c, and an airtight retaining device (an open/closing damper) 1d, respectively.

The same principals of construction and operation would apply to forms and sectional shapes of the gas cooling chamber other than the tower type illustrated in FIG. 1.

In reference to this embodiment of the present invention, high temperature exhaust gas Gh (temperature of approximately 240° C. and a flow volume of approximately 90,000 $Nm^3/H$) emitted from a waste heat boiler (not illustrated) of an industrial waste incinerator is led into the aforementioned gas cooling chamber 1, approximately 150° C.–1,000° C. is the desired temperature for high temperature exhaust gas as an object of temperature reduction.

Further, the exhaust gas that is the object of temperature reduction can be exhaust gas from any combustion system, and there is no specific condition on its flow volume.

A thermal water tank 2 is in the form of a heat and pressure resisting metal tank having a required capacity and protected by a heat insulating material.

Water of high temperature (pressurized thermal water Wt) with the temperature higher than a boiling point (100° C.) under atmospheric pressure is stored in said thermal tank 2. In the embodiment, thermal water Wt of high temperature and high pressure having the temperature of 142.0° C. (saturated water at pressure 3 $kg/cm^2$ G) is stored in a thermal tank 2 with pressure resistance of 10 $kg/cm^2$.

In reference to the embodiment shown in FIG. 1, steam S for heating is led into a thermal tank 2 from a waste boiler (not illustrated) installed with an industrial waste incinerator, and the temperature of thermal water Wt is retained at the aforementioned 142.9° C. value by means of said heated steam S.

A heat source of thermal water Wt can be constructed so that heat from a separately provided burner or from an electric heater is utilized, in addition to the arrangement wherein steam from a boiler is utilized, as shown in the present embodiment.

When a boiler is provided, so-called continuous blow water from the boiler can be utilized as part of the thermal water. When a deaerator is provided with the boiler, water of high temperature and high pressure produced inside the deaerator can also be utilized as thermal water Wt or as part of thermal water Wt.

The aforementioned pump 3 is designed to supply thermal water Wt to a temperature reduction water nozzle 4. Said pump 4 is to be installed only when it is required in relation to pressure loss of the pipe between thermal tank 2 and temperature reduction water nozzle 4 and also in relation to a potential head of the temperature reduction water nozzle 4.

Figure 2:
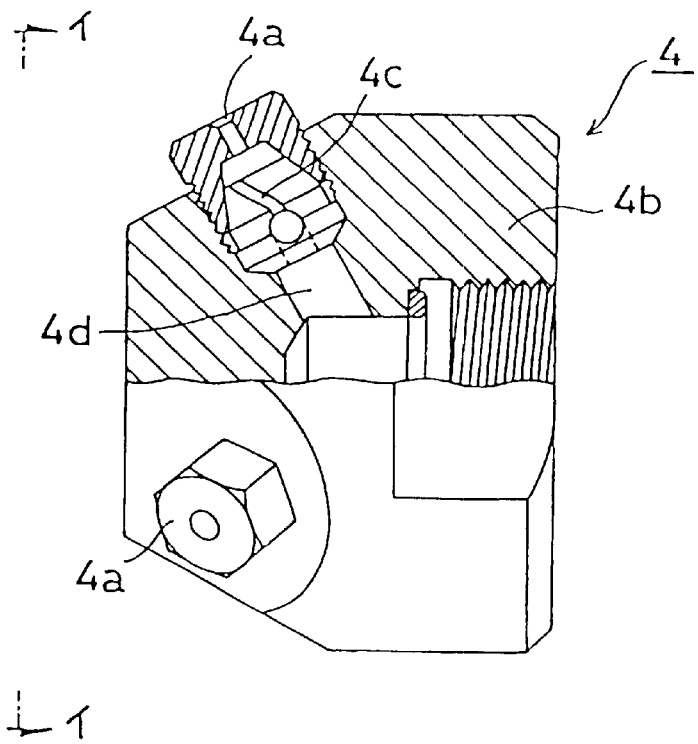
FIG. 2 is a partly longitudinal sectional view of a temperature reduction water nozzle employed according to the present invention.
Figure 3:
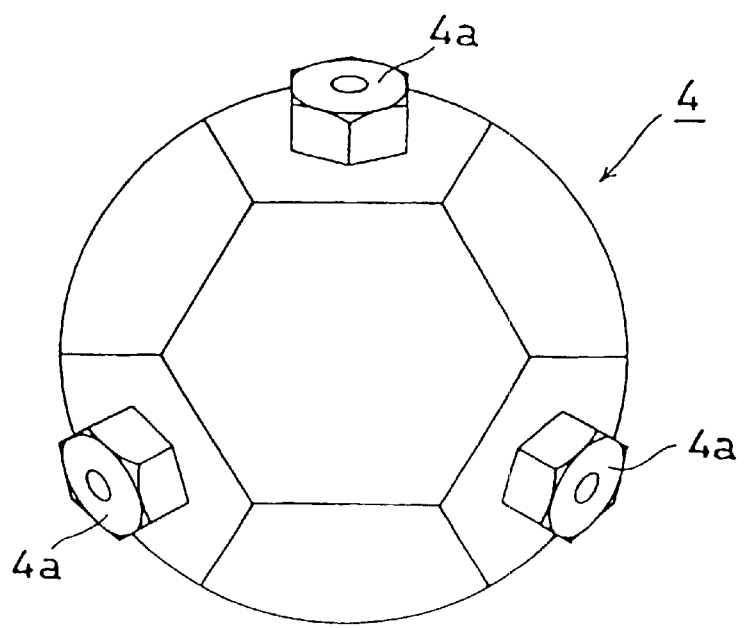
FIG. 3 is a view taken along the line I—I of FIG. 2.

As illustrated in FIG. 2 and FIG. 3, the aforementioned nozzle 4 is of a known hollow cone type. In reference to this further embodiment according to the present invention, a nozzle equipped with 3 ejection apertures 4a at intervals of the angle of 120° is mounted at the center of the upper part of the gas cooling chamber 1.

Referring to FIG. 2, 4b is a main body, 4c a screw and 4d a water lead-in hole.

An ejection angle of each ejection mouth 4a of the temperature reduction water nozzle 4 is fixed approximately at 60° (under the ejection pressure of 3 kgf/cm²) and the flow volume is fixed approximately at 3.8 l/min (under the ejection pressure of 3 kgf/cm²).

Further, in reference to the embodiment shown in FIG. 2, a hollow cone type spraying nozzle is utilized as a temperature reduction water nozzle 4. However, any kind, type or structure of nozzle 4 can be chosen for applying to the present invention as long as it enables spraying water with a particle diameter of 190–300 μm from previous water with normal temperature under a pressure of 2–3 kgf/cm².

A temperature control device 5 receives temperature detection signals from an exhaust gas temperature detector 5b installed on the inlet side and an exhaust gas temperature detector 5a installed on the outlet side, adjusts the volume of thermal water to be sprayed into a gas cooling chamber 1 by means of an opening and closing mechanism to control a temperature reduction water volume valve 6 and retain the temperature of low temperature exhaust gas G emitted from the exhaust gas outlet 1b at set values.

In reference to embodiment according to the present invention, thermostat type temperature detectors are employed for the exhaust gas temperature detectors 5a, 5b. However, such detectors can be replaced by any other suitable kind of detector.

In reference to this embodiment according to the present invention, a temperature reduction water volume control valve 6 is provided in a passageway for supplying thermal water. However, as illustrated in the previous FIG. 6, a temperature reduction water volume control valve 6 can be provided in a return passageway for thermal water Wt. Any method of control can be applied as long as the volume of thermal water to be supplied to the temperature reduction water nozzle is able to be controlled.

At the time when the temperature of high temperature exhaust gas Gh from a combustion system is reduced, thermal water Wt in a thermal tank 2 is sent to a temperature reduction water nozzle 4 by means of internal pressure in the thermal tank 2 and/or pressurized power of water, and sprayed into high temperature exhaust gas Gh through the temperature reduction water nozzle.

Thermal water Wt sprayed through a temperature reduction water nozzle 4 becomes pressurized water having a temperature considerably higher than a boiling point (100° C.) under atmospheric pressure, and abruptly boils under the reduced pressure in the vicinity of an ejection mouth 4a of the temperature reduction water nozzle 4, producing atomised spray particles having diameters of 50–5 μm, and turns to steam instantly when evaporated, thus realising cooling of exhaust gas by means of heat exchange with high temperature exhaust gas Gh in the gas cooling chamber 1.

Low temperature exhaust gas G cooled to the prescribed temperature is extracted through an exhaust gas outlet 1b outside, while ash C (dust and the like), separated from exhaust gas, is discharged outside through an ash outlet 1c.

EXAMPLE 1

A tower type device for temperature reduction equipped with a cylindrically shaped gas cooling chamber 1 is formed to reduce the temperature of high temperature exhaust gas Gh having the exhaust gas flow volume of 90,000 Nm³/H (exhaust gas from a waste heat boiler equipped with an industrial waste incinerator) and a temperature of 240° C. to a temperature of 180° C. Under conditions that the temperature of thermal water is 142.9° C. (saturated water of pressure 3 kg/cm² G), and the volume of thermal water to be sprayed is 2.5 ton/hr, the required capacity of the gas cooling chamber 1 reaches 3000 mm in an internal diameter and 6000 mm in height, allowing the aforementioned high temperature exhaust gas Gh to be turned sufficiently to low temperature exhaust gas G of the prescribed temperature (180° C.) by utilising gas cooling chamber 1.

When exhaust gas under same conditions is treated with a previous tower type temperature reduction device (water of 20° C. and the volume of water to be sprayed approximately 2 ton/hr), a capacity of approximately 4800 mm×9000 mm was required for the gas cooling chamber, while gas cooling chamber 1 according to the present invention is found to be able to be remarkably smaller in size.

According to the present invention, the volume of thermal water Wt to be sprayed increases approximately by 20% compared with the prior art wherein water at 20° C. is employed.

According to the present invention, no difficulties have occurred such as damage to the refractory due to adherence or deposit of dust and the like caused by adherence of water droplets to the wall surface of the gas cooling chamber, enabling highly stable and continuous temperature reduction of high temperature exhaust gas.

Figure 4:
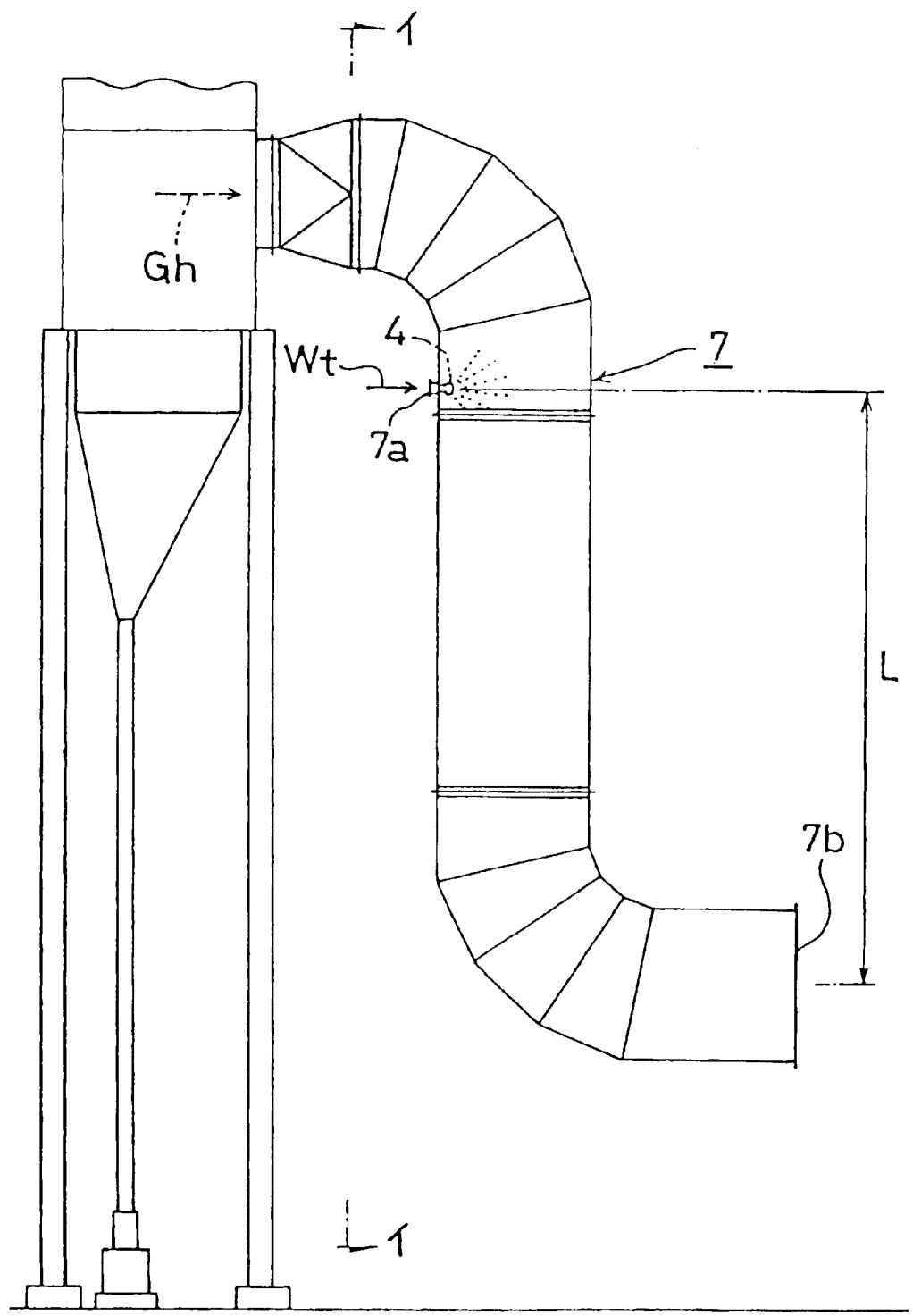
FIG. 4 is a front view of the method and device for temperature reduction of exhaust gas in accordance with another embodiment of the present invention.
Figure 5:
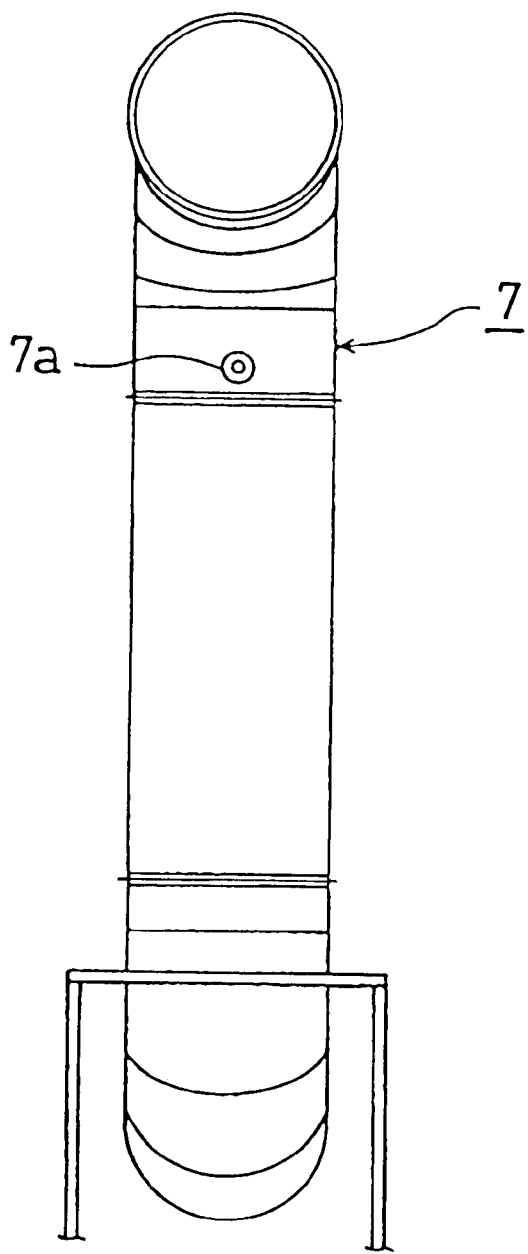
FIG. 5 is a view taken along the line I—I of FIG. 4.

FIG. 4 and FIG. 5 illustrate another embodiment according to the present invention for a method and device for temperature reduction of exhaust gas, wherein thermal water is sprayed into high temperature exhaust gas Gh in a duct 7 through a temperature reduction water nozzle 4 attached to a flange 7a. The flange 7a fixes the temperature reduction water nozzle 4 to the side of an exhaust gas duct 7 for the purpose of leading out high temperature exhaust gas Gh emitted out of a waste incinerator.

Referring now to the embodiment of the present invention shown in FIG. 4 and FIG. 5, the construction remains exactly same as the equipment shown in FIG. 1 and FIG. 2, except that the gas cooling chamber 1 in the embodiment shown in FIG. 1 and FIG. 2 is replaced by a vertical type exhaust gas duct 7.

EXAMPLE 2

If saturated water of 142.9° C. and 3 kg/cm² G is used as thermal water to be sprayed, the internal diameter of the duct is 2000 mm and the length of the duct is 7000 mm. By spraying thermal water Wt of 3.4 ton/hr into the duct 7 through a temperature reduction water nozzle 4, high temperature exhaust gas Gh of 90000 Nm³/H and 240° C. was able to be continuously converted to low temperature exhaust gas G of approximately 180° C. at the duct outlet 7b.

No adherence of water droplets to the inner surface of the duct 7 was observed, and accordingly no adherence and deposit of dust and the like caused by the adherence of water droplets was observed.

Figure 6:
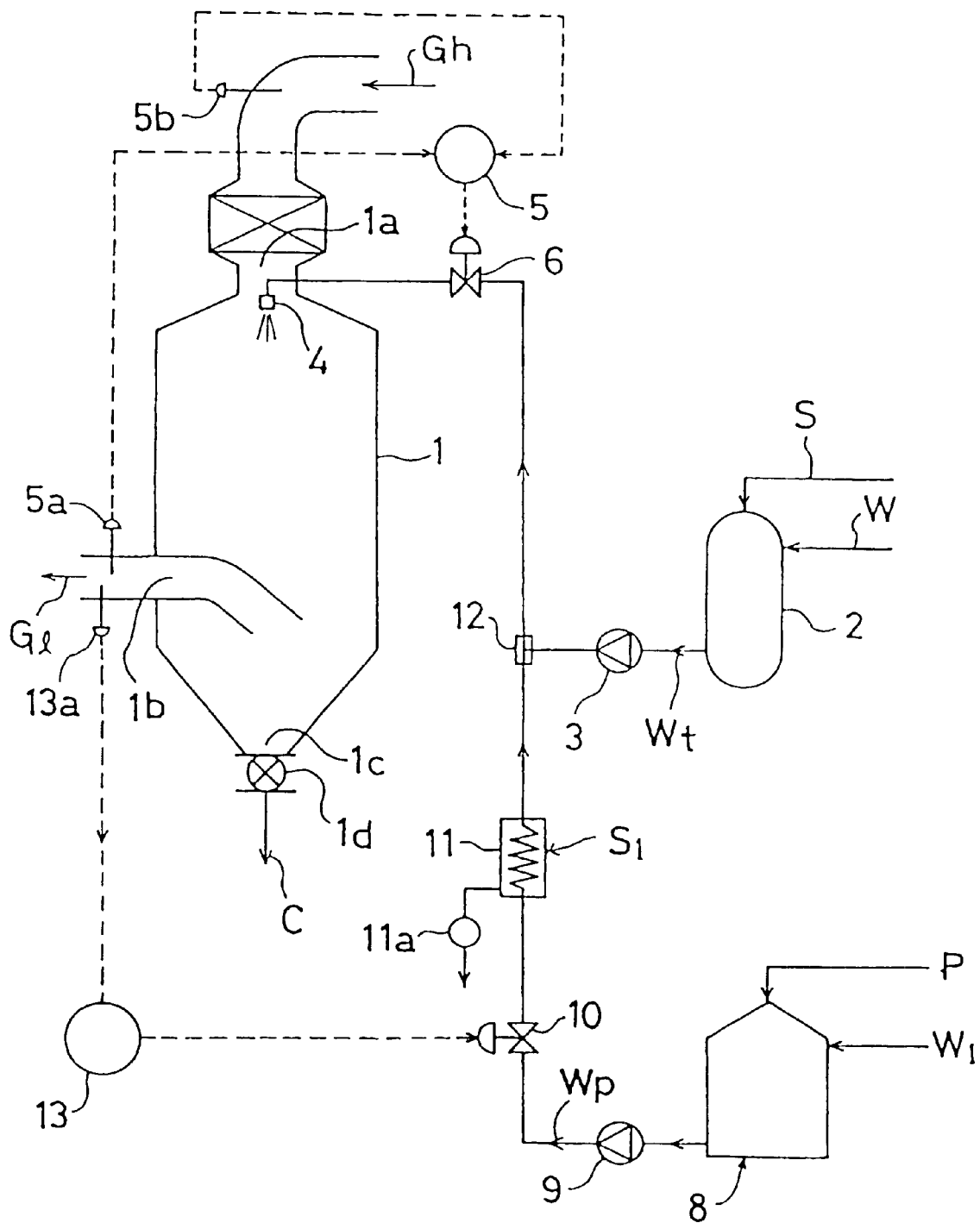
FIG. 6 is a diagrammatical illustration of a method and device for temperature reduction of exhaust gas according to a still further embodiment of the present invention wherein alkaline aqueous solution is mixed into the thermal water.
Figure 7:
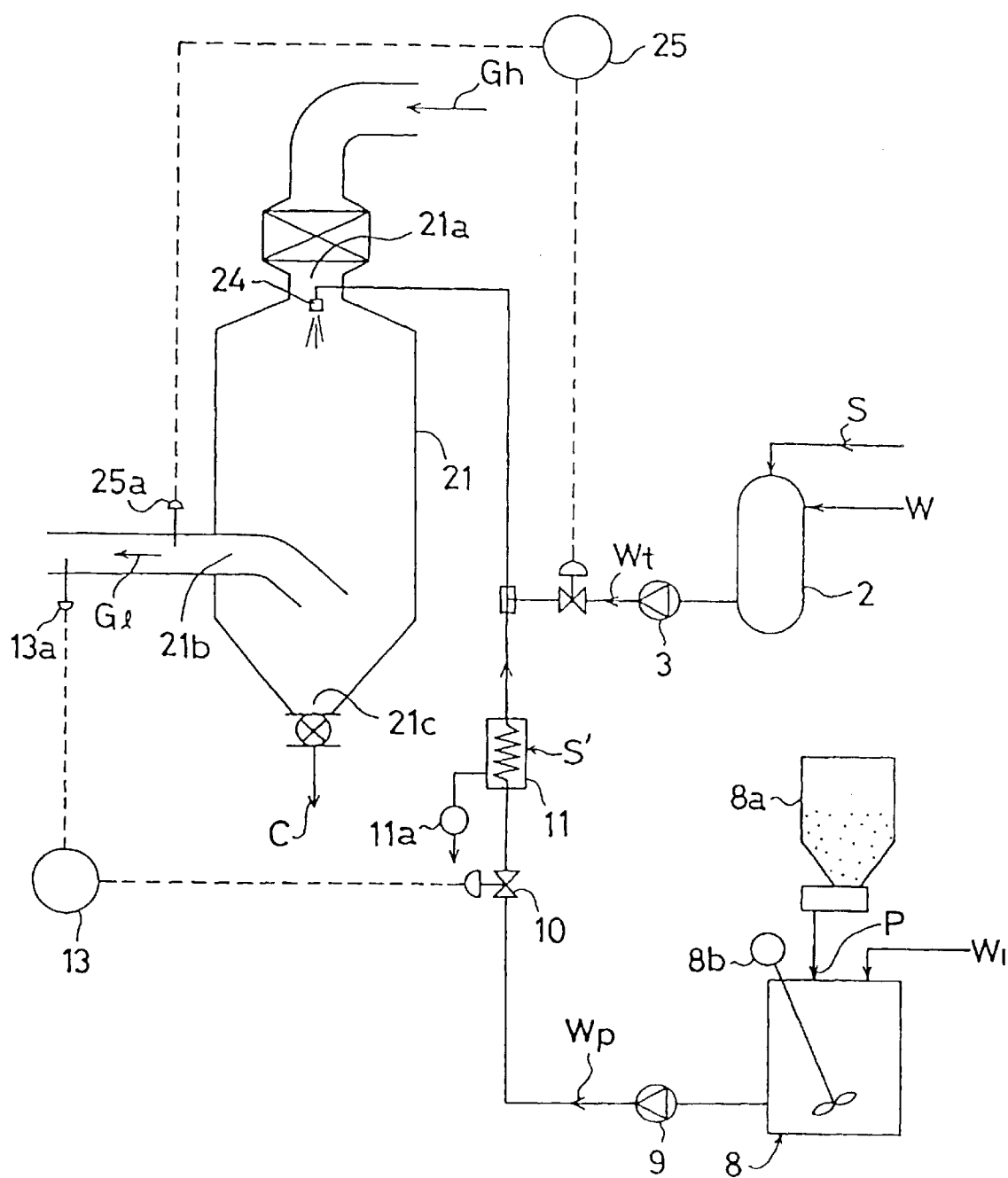
FIG. 7 is a diagrammatical illustration of a method and device for temperature reduction of exhaust gas according to yet another embodiment of the present invention wherein alkaline slurry solution is mixed into the thermal water.

Referring to FIG. 6 and FIG. 7 according to the present invention, there is illustrated a third embodiment for the method and device for temperature reduction of exhaust gas, wherein the temperature of exhaust gas is reduced and an acid component in the exhaust gas is simultaneously removed (or neutralised) by means of spraying alkaline thermal water Wt into high temperature exhaust gas Gh in the gas cooling chamber 1 through a temperature reduction water nozzle 4.

Figure 8:
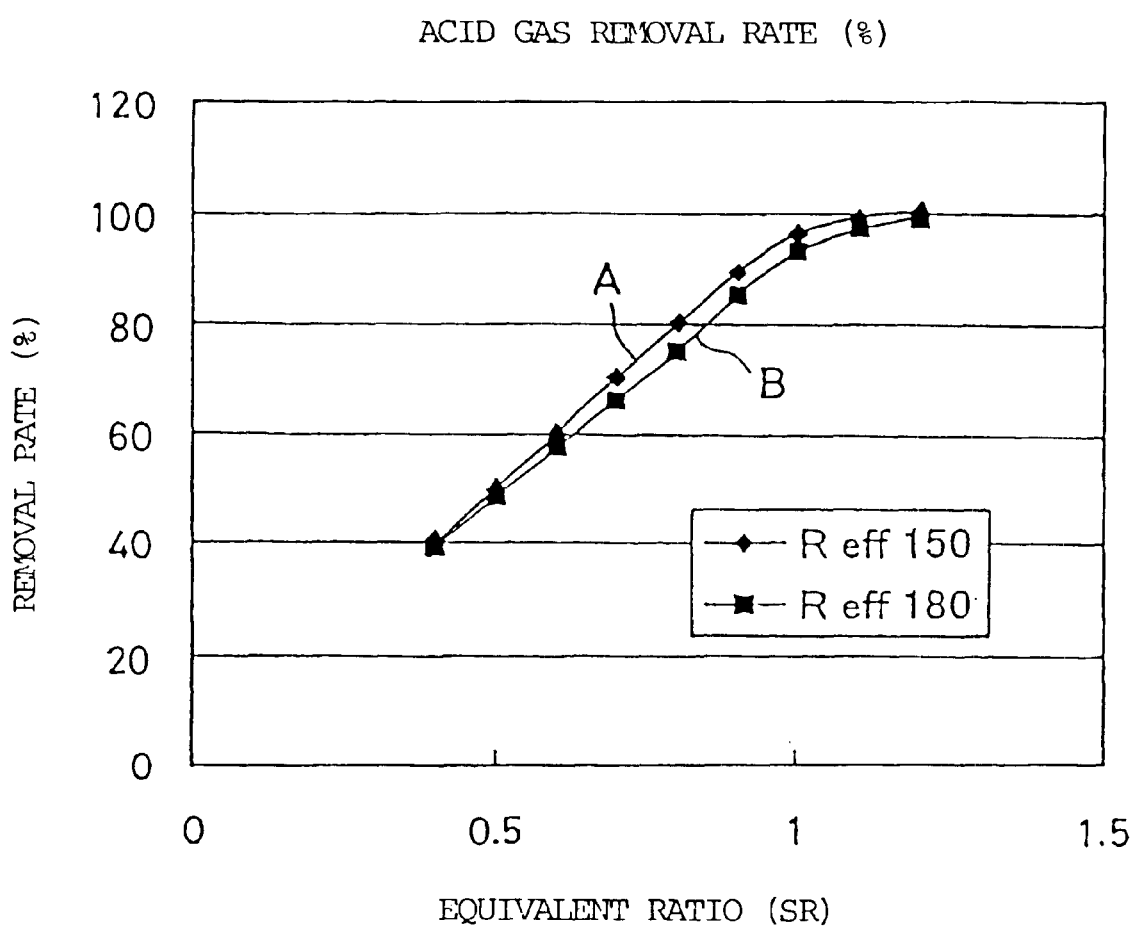
FIG. 8 is a curve showing removal characteristics of acidic gas in the exhaust gas according to the present invention.
Figure 9:
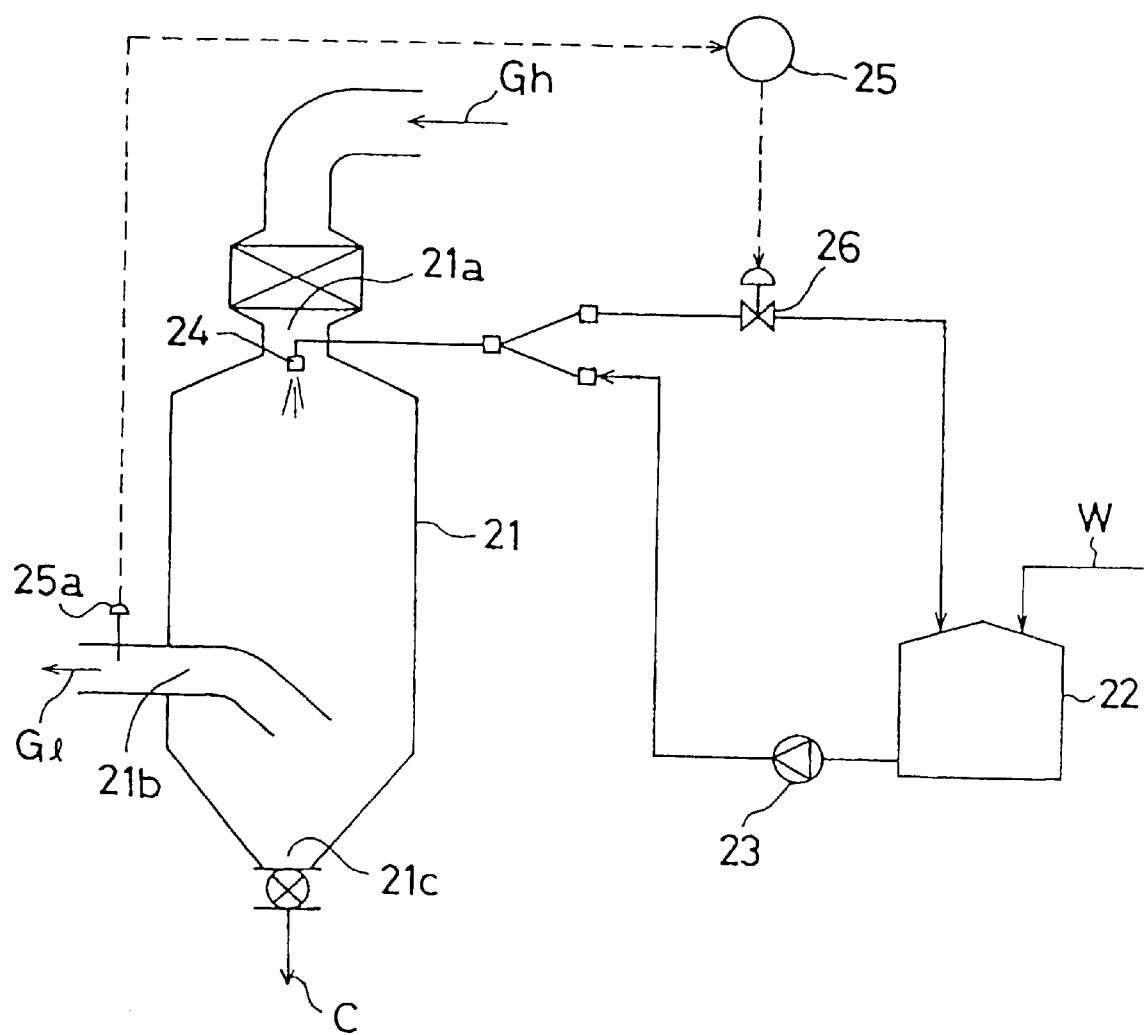
FIG. 9 is a diagram illustrating a device for temperature reduction of exhaust gas according to the prior art.
Figure 10:
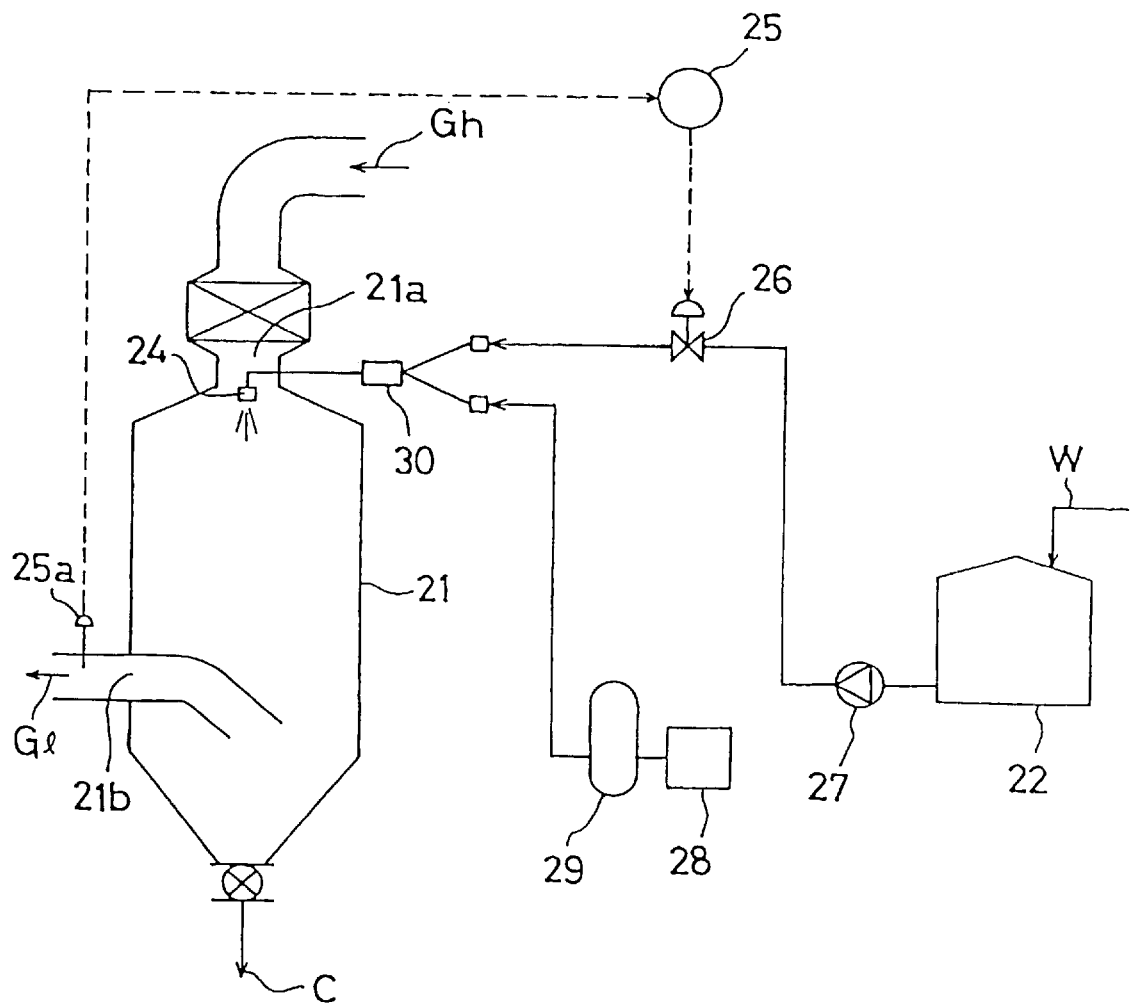
FIG. 10 is a diagram illustrating another device for temperature reduction of exhaust gas according to the prior art.

Referring to FIG. 6 and FIG. 7, 8 is an alkaline solution tank, 8a an alkaline agent feeding device, 8b a stirrer, 9 an alkaline solution pump, 10 an alkaline solution flow volume control valve, 11 an alkaline solution heater, 11a a drain emission valve, 12 a mixer for thermal water Wt and alkaline solution Wp, 13 an acid gas concentration control device, 13a an acid gas concentration detector for low temperature exhaust gas Gl, S1 steam for heating, P alkaline agent, W1 Water and Wp alkaline solution. Excluding these components, all other equipment and devices remain exactly the same as those shown in FIG. 1 and FIG. 2.

Referring to FIG. 6, alkaline aqueous solution is used for alkaline solution Wp to be mixed into thermal water Wt. For example, alkaline aqueous solution, for which alkaline agent P, such as sodium hydroxide (caustic soda, NaOH) and the like dissolved into water W1, is stored in an alkaline solution tank 8.

Alkaline agent P that constitutes the alkaline aqueous solution is not limited to the aforementioned sodium hydroxide as long as the agent is water soluble. For example, magnesium hydroxide ($Mg(OH)_2$) and the like can also be used.

Furthermore, the concentration of alkaline agent in the alkaline aqueous solution stored in the tank 8 is appropriately chosen depending on the temperature of water $W_1$ or solubility of the alkaline agent P used in water $W_1$. When sodium hydroxide is used as alkaline agent P, the alkaline concentration is chosen at a concentration of 29–30%.

Referring now to the aforementioned FIG. 7, alkaline slurry solution is used as the alkaline solution Wp to be mixed into thermal water Wt. For instance, the solid-liquid mixed body (slurry) wherein alkaline P such as calcium hydroxide (slaked lime $Ca(OH)_2$) and the like is suspended dispersively into water $W_1$ stored in an alkaline solution tank 8.

Furthermore, alkaline agent P is not limited to the aforementioned calcium hydroxide. For example, slaked lime (CaO), calcium carbonate ($CaCO_3$), sodium carbonate ($Na_2CO_3$) and the like, can also be used.

The quantity of alkaline solution Wp to be mixed into the aforementioned thermal water Wt is adjusted by a mechanism to control alkaline solution flow volume control valve 10 by opening and closing with an acid gas concentration control device 13 by receiving detection signals from an acid gas concentration detector 13a in low temperature exhaust gas G, whereby acidic gas concentration in the aforementioned low temperature exhaust gas G is maintained at a prescribed value.

The quantity of alkaline solution Wp to be sent to the thermal water Wt is determined with reference to the temperature of low temperature exhaust gas G, the type of acid gas to be removed, the targeted removal rate of acid gas, and the like. Normally, 1.0–1.5 times volume of alkaline agent P in an equivalent ratio to the volume of acidic gas to be removed in the exhaust gas is mixed into thermal water Wt.

The aforementioned alkaline solution heater 11 is used to heat alkaline solution Wp to be mixed into thermal water Wt to a prescribed temperature, thus preventing the temperature of alkaline temperature reduction water flowing out of a mixer 12 from being exceedingly low.

When alkaline solution Wp is small in amount or the temperature of alkaline solution is comparatively low (for example, 80–90° C.), turbulence in the thermal water Wt occurs with less frequency at the time of mixing. Accordingly, in such a case, the installation of the aforementioned alkaline solution heater 11 can be omitted.

Referring to the embodiment shown in FIG. 6 and FIG. 7, alkaline temperature reduction water is ejected into a gas cooling chamber 1. However, needless to say, alkaline temperature reduction water can be ejected into an exhaust gas duct 7 shown in FIG. 4 and FIG. 5 instead of the aforementioned gas cooling chamber 1.

EXAMPLE 3

A tower type device for temperature reduction equipped with a cylindrically shaped gas cooling chamber is formed to reduce the temperature of 240° C. of high temperature exhaust gas Gh having an exhaust gas flow volume of 90,000 $Nm^3/h$ (HCl concentration of exhaust gas from the waste heat boiler of the industrial waste incinerator 800 ppm) to temperature of 180° C. Under conditions wherein the temperature of thermal water Wt is 142.9° C. (saturated water of pressure 3 $kg/m^2$ G), the temperature of alkaline solution Wp (NaOH aqueous solution of concentration 25%) Wp is 25° C., the supply volume of thermal water Wt is 1.9 ton/h, the supply volume of alkaline solution Wp is 0.606 ton/h, the supply volume of alkaline thermal water to be sprayed is approximately 2.56 ton/h, the required capacity of gas cooling chamber 1 reaches 3000 mm in the internal diameter and 6000 mm in height, allowing the temperature of the aforementioned high temperature exhaust gas Gh to be reduced sufficiently to the prescribed temperature (180° C.), to turn it to low temperature exhaust gas G.

The volume of alkaline agent P to be supplied to the HCl volume in the exhaust gas is found, then, to be 1.0 at an equivalent ratio, while the removal rate of HCl detected by an acidic gas concentration detector 13a is approximately 93% at the time when the temperature of low temperature exhaust gas G is 180° C.

The volume of alkaline solution Wp to be supplied is calculated as follows: the HCl volume in the exhaust gas of 90,000 $Nm^3/h$, having an HCl concentration of 800 ppm, is $9\times10^4\times800\times10^{-6}=72$ $Nm^3/h$.

An equivalent/h of HCl of 72 $Nm^3/h$ is 72/22.4=3.214 kmol. Since the equivalent ratio is 1, an equivalent/h of NaOH to be supplied becomes 214 kmol/hr. When NaOH of an equivalent/hr is supplied with NaOH aqueous solution Wp, the supply volume of NaOH aqueous solution becomes 40 kg/kmol×3.214 kmol/h×100/25=606 kg/h.

The reaction formulas for the removal of acidic gas in exhaust gas by means of spraying the aforementioned NaOH aqueous solution are as follows:

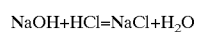

The NaCl and the like produced are after-treated by means of electrolysis and the like. Since these methods of treatment are already known, a detailed explanation is omitted.

Taking into consideration the external turbulence of the thermal water Wt at the time of mixing alkaline solution (25% NaOH solution) Wp of the normal temperature (25° C.), the aforementioned alkaline solution Wp is first heated to a temperature of approximately 80° C. by an alkaline solution heater 11, and then supplied to a mixer 12. However, even when the heater 11 is not in use, no particular difficulties occurred except that the volume of sprayed water through temperature reduction water nozzle 4 was slightly lowered due to the reason that the temperature of the alkaline thermal water was reduced at the outlet side of the mixer 11.

When acid gas of high concentration is contained in the exhaust gas, the mixing volume of alkaline solution Wp increases, thus further lowering the temperature of thermal water Wt after mixing. However, it has become apparent that the situation can be resolved by fixing the temperature of thermal water Wt slightly higher before mixing without installing a heater 11.

Referring to FIG. 8 in the Example 3, changes in the removal rate of acid gas (HCl) is shown when the supply volume of NaOH aqueous solution Wp to be fed to a mixer changes. Curve A represents values when the temperature of low temperature gas G is fixed at 180° C., while curve B represents values when it is fixed at 150° C. The vertical axis of the curve is for acid gas removal rate (%), while the transverse axis is for the supply volume of NaOH shown in an equivalent ratio. As clearly indicated in FIG. 8, the lower the temperature of low temperature exhaust gas the better the improvements of the removal rate. The table 1 shown below indicates the concrete numerical values measured with the embodiment illustrated in FIG. 8.

TABLE 1

|  |  | Equivalent ratio | | | | | | | | |
|---|---|---|---|---|---|---|---|---|---|---|
|  |  | 0.4 | 0.5 | 0.6 | 0.7 | 0.8 | 0.9 | 1.0 | 1.1 | 1.2 |
| ※1 | HCl Removal rate % | 40 | 50 | 60 | 70 | 80 | 89 | 96 | 99 | 100 |
| ※2 | HCl Removal rate % | 39 | 48 | 57 | 66 | 75 | 85 | 93 | 97 | 99 |

※1 Temperature of low temperature exhaust gas 150° C.
※2 Temperature of low temperature exhaust gas 180° C.

With reference to the present invention, since pressurized thermal water is in use as temperature reduction water, sprayed thermal water boils abruptly in the vicinity of an ejection aperture of the temperature reduction water nozzle, thus producing atomised particles having diameters up to approximately 10 μm, which turn to steam instantly.

Accordingly, troubles caused by sprayed thermal water in the form of water droplets directly hitting and adhering to the wall surface of a gas cooling chamber are not seen, thus eliminating damage to the wall surface of the gas cooling chamber due to the adherence of water droplets and difficulties due to the deposition of dust.

Furthermore, cooling performance of sprayed water is greatly improved due to instant evaporation of sprayed thermal water, thus enabling a remarkable reduction in size of the gas cooling chamber. With regards to the previous gas cooling chamber that utilized water of normal temperature as temperature reduction water, the heat load of the gas cooling chamber is normally approximately 5,000–15,000 kcal/m$^3$·H, whereas with regard to the gas cooling chamber according to the present invention, it is found possible to raise the heat load of the gas cooling chamber to 50,000–150,000 kcal/m$^3$·H. This enables a remarkable reduction in size of the gas cooling chamber.

Furthermore, when sufficient pressure is found in the thermal water tank, a temperature boosting pump is not required. Therefore, the facilities can be constructed simply, thus allowing a remarkable reduction in running costs.

In the case where an incinerator or a boiler is equipped with a deaerator, thermal water of the deaerator can be utilized as it is. The only equipment that is needed for temperature reduction water is pipes from a temperature reduction water nozzle and a deaerator. This also allows inexpensive construction of the equipment.

Owing to the fact that the volume of the gas cooling chamber can be made small and thermal water can be sprayed into a high temperature exhaust duct without installing a gas cooling chamber, installation costs can be remarkably reduced.

Furthermore, with an incinerator equipped with a boiler and a waste heat boiler, the volume of chemical agents to be used for the equipment for desalinisation and desulfurisation of exhaust gas can also be reduced.

In the event that alkaline thermal water is supplied to a temperature reduction water nozzle, a high removal rate of acidic gas contained in exhaust gas can be achieved with less alkaline agent, thus making the acidic gas removal equipment installed on the downstream side of the device for temperature reduction of exhaust gas smaller in size as well as considerably reducing the amount of agents to be used.

Furthermore, alkaline solution to be mixed into the thermal water is not required to be heated to a high temperature. The stable operation of the device for temperature reduction of exhaust gas can be realised by fixing the temperature of thermal water slightly higher while mixing alkaline solution of normal temperature into the thermal water.

As explained above, the present invention achieves excellent and practical effects.

While the present invention has been explained by means of certain preferred embodiments one of ordinary skill in the art will recognise that additions, deletions, modifications, substitutions and improvements can be made while remaining within the scope of the appended claims.

What is claimed is:

1. A method for reducing the temperature of exhaust gas flowing from an exhaust gas outlet, comprising the steps of:
   (1) providing pressurized water with a temperature higher than a boiling point of water under atmospheric pressure;
   (2) spraying the water of step (1), into a gas cooling chamber having a wall surface and containing exhaust gas, with a temperature reduction water nozzle installed at an upper part of the gas cooling chamber in the vicinity of a gas inlet for the exhaust gas to produce micro-sized particles of atomized water;
   (3) evaporating the micro-sized particles of atomized water so that there is no direct impact on the wall surface of the gas cooling chamber; and
   (4) detecting a temperature of exhaust gas flowing from the exhaust gas outlet and controlling said temperature by controlling a volume of water sprayed into the exhaust gas in step (2).

2. A method for reducing the temperature of exhaust gas flowing from an exhaust gas outlet, comprising the steps of:
   (1) providing pressurized water with a temperature higher than a boiling point of water under atmospheric pressure;
   (2) spraying the water of step (1), into an exhaust gas duct having an inside and containing exhaust gas, with a temperature reduction water nozzle installed at an upper part of the exhaust gas duct in the vicinity of a gas inlet for the exhaust gas to produce micro-sized particles of atomized water;
   (3) evaporating the micro-sized particles of atomized water so that there is no direct impact on the inside of the exhaust gas duct; and
   (4) detecting a temperature of exhaust gas flowing from the exhaust gas outlet and controlling said temperature by controlling the volume of water sprayed into the exhaust gas in step (2).

3. A method according to claim 1, wherein said step (1) further comprises taking water out of a deaerator or taking continuous blow water from a boiler.

4. A method according to claim 2, wherein said step (1) further comprises taking water out of a deaerator or taking continuous blow water from a boiler.

5. A method according to claim 1, wherein the micro-sized particles have diameters in a range of approximately 3 $\mu$m–50 $\mu$m.

6. A method according to claim 2, wherein the micro-sized particles have diameters in a range of approximately 3 $\mu$m–50 $\mu$m.

7. A method according to claim 1, wherein the micro-sized particles have diameters up to approximately 10 $\mu$m.

8. A method according to claim 2, wherein the micro-sized particles have diameters up to approximately 10 $\mu$m.

* * * * *

UNITED STATES PATENT AND TRADEMARK OFFICE
CERTIFICATE OF CORRECTION

PATENT NO. : 6,523,811 B1
DATED : February 25, 2003
INVENTOR(S) : Masayuki Kumada and Keiji Mukai It is certified that error appears in the above-identified patent and that said Letters Patent is hereby corrected as shown below:

Title page,
Insert Item -- [60]     Related U.S. Application Data
        Continuation of application No. PCT/JP99/07162, filed on December 20, 1999 --
Insert Item -- [30]     Foreign Application Priority Data
        January 18, 1999     (JP) …………………….. 11-8847 --

Signed and Sealed this

Twenty-eighth Day of December, 2004

JON W. DUDAS
*Director of the United States Patent and Trademark Office*